US011080766B1

(12) United States Patent
Cselle et al.

(10) Patent No.: US 11,080,766 B1
(45) Date of Patent: *Aug. 3, 2021

(54) AD PLACEMENT IN MOBILE APPLICATIONS AND WEBSITES

(71) Applicant: Twitter, Inc., San Francisco, CA (US)

(72) Inventors: Gabor Cselle, San Francisco, CA (US); Nassar Stoertz, Burlingame, CA (US); Tural Badirkhanli, San Francisco, CA (US); Carl Joseph Blubaugh, San Francisco, CA (US); Boris Logvinskiy, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/398,021

(22) Filed: Apr. 29, 2019

Related U.S. Application Data

(63) Continuation of application No. 14/562,012, filed on Dec. 5, 2014, now Pat. No. 10,275,804.

(60) Provisional application No. 62/066,628, filed on Oct. 21, 2014, provisional application No. 61/913,183, filed on Dec. 6, 2013.

(51) Int. Cl.
*G06Q 30/00* (2012.01)
*G06Q 30/02* (2012.01)

(52) U.S. Cl.
CPC ..... *G06Q 30/0277* (2013.01); *G06Q 30/0276* (2013.01)

(58) Field of Classification Search
None
See application file for complete search history.

(56) References Cited

U.S. PATENT DOCUMENTS

| 7,752,202 | B2* | 7/2010 | Kobori | H04L 67/2823 |
| | | | | 707/736 |
| 8,667,532 | B2* | 3/2014 | Heath | G06Q 30/02 |
| | | | | 705/1.1 |
| 9,549,227 | B2 | 1/2017 | Campbell et al. | |
| 10,152,731 | B1 | 12/2018 | Cselle et al. | |

(Continued)

FOREIGN PATENT DOCUMENTS

| EP | 1640900 A1 * | 3/2006 | ......... G06Q 30/0269 |
| JP | 07021159 A | 1/1995 | |

(Continued)

OTHER PUBLICATIONS

Hemley, Debbie. 26 Tips to Create a Strong Social Media Content Strategy. (Jun. 25, 2013). Retrieved online Dec. 10, 2018. https://www.socialmediaexaminer.com/26-tips-to-create-a-strong-social-media-content-strategy/ (Year: 2013).*

(Continued)

*Primary Examiner* — James A Reagan
(74) *Attorney, Agent, or Firm* — Smith Baluch LLP

(57) ABSTRACT

A method of placing advertisements involves sending, from a device, a request for at least one ad position, receiving, in response to the request, ad positioning information specifying an ad position in a stream and a related content position in the stream, determining, by the device, that a related content item is present in the stream, and overriding, by the device, the ad positioning information by placing an advertisement associated with the related content in the related content position within the stream.

17 Claims, 8 Drawing Sheets

(56) References Cited

U.S. PATENT DOCUMENTS

| | | | |
|---|---|---|---|
| 10,275,804 B1 * | 4/2019 | Cselle | G06Q 30/0276 |
| 10,943,270 B1 | 3/2021 | Cselle et al. | |
| 2007/0061300 A1 * | 3/2007 | Ramer | G06Q 30/0241 |
| 2008/0215428 A1 * | 9/2008 | Ramer | G06Q 30/0269 705/14.53 |
| 2009/0222329 A1 * | 9/2009 | Ramer | G06Q 30/0254 705/14.52 |
| 2009/0248524 A1 | 10/2009 | Defoy et al. | |
| 2011/0055209 A1 | 3/2011 | Novac et al. | |
| 2011/0258046 A1 * | 10/2011 | Ramer | H04W 4/029 705/14.53 |
| 2011/0258049 A1 | 10/2011 | Ramer et al. | |
| 2012/0027816 A1 | 2/2012 | Kusumba et al. | |
| 2012/0059708 A1 | 3/2012 | Galas et al. | |
| 2012/0278164 A1 * | 11/2012 | Spivack | G06Q 10/10 705/14.52 |
| 2013/0055097 A1 * | 2/2013 | Soroca | G06F 16/9577 715/738 |
| 2013/0159431 A1 * | 6/2013 | Berry | H04L 51/08 709/206 |
| 2013/0198331 A1 | 8/2013 | Ho et al. | |
| 2013/0304581 A1 * | 11/2013 | Soroca | G06Q 30/0267 705/14.64 |
| 2014/0011562 A1 | 1/2014 | Smith et al. | |
| 2014/0055803 A1 | 2/2014 | Uhlig et al. | |
| 2014/0067542 A1 * | 3/2014 | Everingham | G06Q 30/0623 705/14.64 |
| 2014/0068692 A1 | 3/2014 | Archibong et al. | |
| 2014/0115625 A1 * | 4/2014 | McCoy | H04N 21/23424 725/34 |
| 2014/0282126 A1 | 9/2014 | Ma | |
| 2016/0050465 A1 | 2/2016 | Zaheer et al. | |
| 2016/0104201 A1 | 4/2016 | Greenberg et al. | |
| 2017/0011418 A1 | 1/2017 | Denton et al. | |
| 2021/0090132 A1 | 3/2021 | Cselle et al. | |

FOREIGN PATENT DOCUMENTS

| | | | | |
|---|---|---|---|---|
| JP | 2003091476 A | * | 3/2003 | G06Q 13/00 |
| JP | 2003091476 A | | 3/2003 | |
| WO | WO-2008131209 A1 | * | 10/2008 | C10J 3/723 |
| WO | 2010003129 A2 | | 1/2010 | |
| WO | 2010123242 A2 | | 10/2010 | |

OTHER PUBLICATIONS

Lisa Peterson et al. Location-Based Advertising The Key to Unlocking the Most Value in the Mobile Advertising and Location-Based Services Markets. (Dec. 2009). Retrieved online May 16, 2021. https://www.mmaglobal.com/files/PetersonMobility_20100217144146.pdf (Year: 2009).*

S. Shunmuga Krishnan et al. Understanding the Effectiveness of Video Ads: A Measurement Study. (Oct. 2013). Retrieved online May 16, 2021. https://www.akamai.com/it/it/multimedia/documents/technical-publication/understanding-the-effectiveness-of-video-ads-a-measurement-study-technical-publication.p (Year: 2013).*

"Making best use of Outlook 2010 using Microsoft Exchange," IT Training and Assesment Unit, Queen's University Belfast. accessed from https://www.qub.ac.uk/directorates/media/Media.300678.en.pdf, Jun. 2012, 2 pages.

Amendment in Response to Office Action dated Jun. 23, 2017, from U.S. Appl. No. 14/561,984, filed Nov. 24, 2017, 25 pp.

Amendment in Response to Office Action dated May 31, 2017, from U.S. Appl. No. 14/562,012, filed Nov. 8, 2017, 19 pp.

Final Office Action from U.S. Appl. No. 14/562,012, dated May 31, 2017, 24 pp.

Office Action from U.S. Appl. No. 14/561,984, dated Jun. 23, 2017, 20 pp.

Prosecution History from U.S. Appl. No. 14/561,984, dated Nov. 10, 2016 through Mar. 19, 2019, 259 pp.

U.S. Appl. No. 14/561,984, by Gabor Cselle, filed Dec. 5, 2014.

U.S. Appl. No. 16/398,021, filed Apr. 29, 2019, naming inventors Cselle et al.

Prosecution History from U.S. Appl. No. 14/562,012, dated Nov. 10, 2016 through Mar. 19, 2019, 259 pp.

U.S. Appl. No. 16/215,309, filed Dec. 10, 2018, naming inventors Cselle et al.

Rich Media Mobile Advertising Guidelines. Version 1.0. Mobile Marketing Association Feb. 8, 2011. Accessed at https://www.mmaglobal.com/files/rmma.pdf. 14 pages.

Autocomplete for Addresses and Search Terms. Google Oct. 8, 2013. Accessed at https://developers.google.com/maps/documentation/javascript/places-autocomplete, 22 pages.

* cited by examiner and # AD PLACEMENT IN MOBILE APPLICATIONS AND WEBSITES

CROSS-REFERENCE TO RELATED APPLICATIONS

This application is a continuation of U.S. patent application Ser. No. 14/562,012, filed on Dec. 5, 2014, and entitled: "Ad Placement In Mobile Applications and Websites," which is a non-provisional patent application of U.S. Provisional Patent Application Ser. No. 61/913,183, filed on Dec. 6, 2013, and entitled: "Methods and Apparatus for Scalable Native In-Stream Advertising in Mobile Applications and Websites," and U.S. Provisional Patent Application Ser. No. 62/066,628, filed on Oct. 21, 2014, and entitled: "Scalable Native In-Stream Advertising for Mobile Applications and Websites." Accordingly, this non-provisional patent application claims priority to U.S. Provisional Patent Application Ser. Nos. 61/913,183 and 62/066,628 under 35 U.S.C. § 119(e). U.S. Provisional Patent Application Ser. Nos. 61/913,183 and 62/066,628 and U.S. patent application Ser. No. 14/562,012, are hereby incorporated by reference in their entirety.

BACKGROUND

Advertising on websites and/or mobile devices typically involves simply inserting a banner ad of a standard size at a fixed position on the screen. A standard size is helpful because advertisers understand the size and how it will look, as well as enabling advertisers to easily advertise across a variety of locations. However, "banner blindness" is a phenomenon whereby users become conditioned to ignore the standardized banners since they are so ubiquitous. Native advertising is a type of advertising that allows the developers and publishers of applications to present advertising within the stream of content, which benefits the publishers by decreasing banner blindness and improving ad revenue, while also benefiting the users by not reserving a substantial amount of screen real estate for the permanent display of ads.

COPYRIGHT NOTICE

A portion of the disclosure of this patent document may contain material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

SUMMARY

In general, in one aspect, the invention relates to a method of placing advertisements, comprising: sending, from a device, a request for at least one ad position; receiving, in response to the request, ad positioning information, wherein the ad positioning information comprising an ad position in a stream and a related content position in the stream, wherein the ad position in the stream and the related content position in the stream are different positions within the stream; determining, by the device, that a related content item is present in the stream, wherein the stream in displayed within an application, wherein the related content item is located a first position within the stream; and overriding, by the device, the ad positioning information by placing an advertisement associated with the related content in the related content position within the stream.

In general, in one aspect, the invention relates to a method of placing advertisements, comprising: receiving, from a device, a request for at least one ad position in a stream in an application executing on the device; in response to the request: determining ad positioning information, wherein the ad positioning information specifies ad positioning information for at least two different ad formats, wherein the at least two different ad formats comprise video, text only, and text and images; and providing the ad positioning information to the device.

In general, in one aspect, the invention relates to a system for placing advertisements, comprising: an ad server configured to: receive a request for at least one ad position from a device; in response to the request: determine ad positioning information comprising an ad position in a stream and a related content position in the stream, wherein the related content positon is associated with a specific advertisement; and provide the ad positioning information to the device.

DETAILED DESCRIPTION

Figure 1:
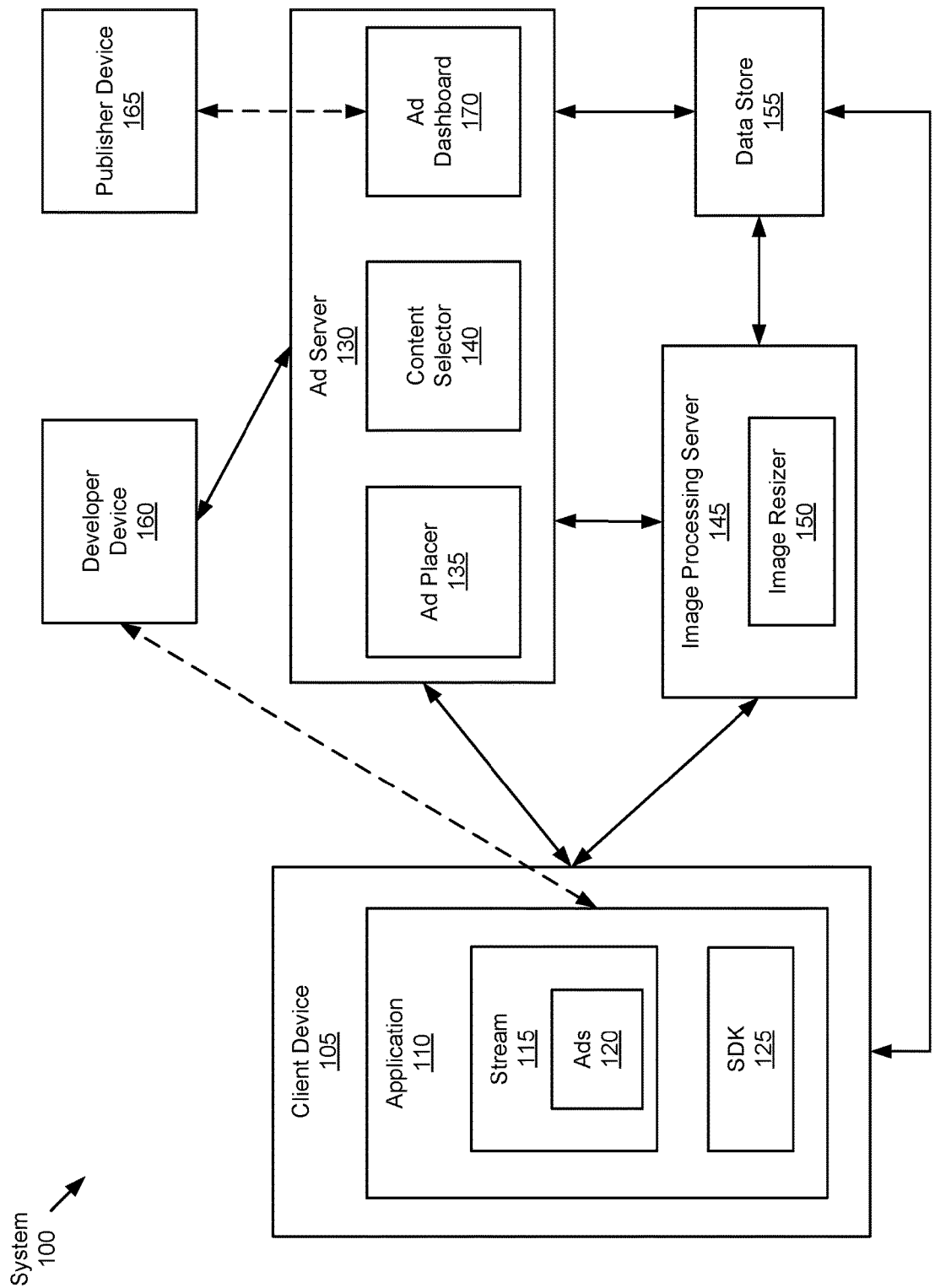
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout this detailed description the terms "ad" and "advertisement" may be used interchangeably. Additionally, the advertisements referred to throughout this specification are "native" ads, whether or not the adjective "native" is included when referring to an advertisement. To aid in the understanding of the invention, a few terms will be defined. A developer is the creator(s) of an application. The developer may decide whether or not to allow advertisements to appear in his or her application, and/or the format in which the advertisements will appear. A publisher is an entity that distributes an application or serves a website, which may include advertisements that are displayed to the user. A publisher may work with any number of advertisers and/or developers. The advertiser is the entity for which the advertisements are being shown.

In general, embodiments of the invention provide a method, system, and/or computer readable medium for positioning ads. Specifically a request is sent from a device for at least one ad position, and positioning information is received in response. The positioning information may include a specific position for advertisements, and/or related content positions for placing advertisements next to content similar to the advertisement. The device may determine when related content is present, and may then override the ad positioning information received from the ad server by placing the advertisement near the related content.

FIG. 1 shows system (100) which includes client device (105), application (110), stream (115), ads (120), software development kit (SDK) (125), ad server (130), ad placer (135), content selector (140), ad dashboard (170), image processing server (145), image resizer (150), data store (155), developer device (160), and publisher device (165). Each of these components is described below.

In one or more embodiments, client device (105) may be any computing device, such as a smart phone, mobile phone, handheld gaming device, smart watch, personal digital assistant (PDA), laptop computer, desktop computer, etc. While client device (105) is preferably a mobile device, client device (105) may be a non-mobile device. Client device (105) may include any suitable hardware components (not shown) such as a display, touchscreen, speakers, microphone, other input devices, processors, memory, etc. In various embodiments of the invention, the client device (105) is communicatively connected to ad server (130), image processing server (145) and/or data store (155) via wired and/or wireless communications using any suitable communication standard, such as WiFi, cellular data, etc.

In one or more embodiments, client device (105) has one or more applications installed, such as application (110). Application (110) may be any executable code (e.g., binary code) capable of executing on client device (105). Application (110) may be installed by the user or owner of client device (105), or may come installed by the manufacturer of client device (105). Examples of types of programs that application (110) may be include, but are not limited to: web browsers, social networking, messaging, financial, games, productivity, financial, video, photography, etc. In one or more embodiments, application (110) includes a stream (115). The stream (115) is a presentation of, list of, or other organization of content within application (110). The stream (115) may include both content and ads (120). Additional details about streams (115) are described in FIG. 2B. Ads (120) are advertisements provided by the ad server (130). Specifically, in one or more embodiments, ads (120) are native advertisements. Native advertisements are advertisements that match the form and/or function of the platform on which they appear. In other words, rather than appear separate from the stream in a space reserved for advertisements, native ads appear inside the stream in a format and appearance similar to the content. The publisher and/or developer may choose to differentiate advertisements substantially in style or marking from the content in the stream to make it clear to the user that the given item is an advertisement, not content. Additionally, in one or more embodiments, depending on the application (110), the developer, the publisher, or any other suitable factors, one advertisement may have a different format than another advertisement. For example, in an application that is focused on images, an advertisement may be primarily an image with a very limited amount of text. In contrast, if an application is focused on short text messages, the size of an advertisement may be much smaller—such as the same size as the short text messages. The stream (115) and ads (120) are addressed in more detail in FIGS. 2A and 2B.

Figure 2A:
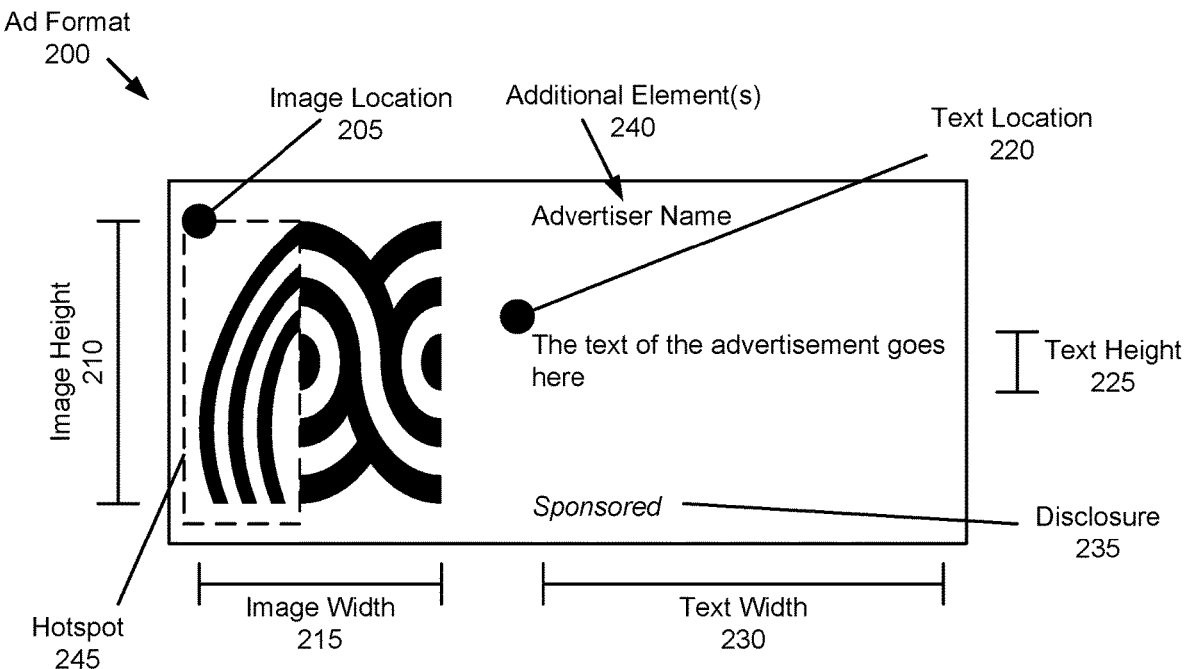
FIG. 2A shows a depiction of an advertisement in accordance with one or more embodiments of the invention.

Referring to FIG. 2A, FIG. 2A shows an advertisement in accordance with one or more embodiments of the invention. Specifically, the ad format (200) is shown. The ad format (200) is a standard set by the developer of an application. Alternatively, the ad format (200) may be set by another suitable entity, such as a publisher of the advertisement. The ad format (200) enables a publisher that wants to show an advertisement to understand the format in which the advertisement will be displayed. In one or more embodiments, an ad format (200) may be specific to a given application, or even a specific use of said application. The ad format (200) includes image location (205), image height (210), image width (215), text location (220), text height (225), text width (230), disclosure (235), additional elements (240), and hot spot (245). Each of these elements may be specified by the developer or other suitable entity, and may vary wildly from one application to another, or even from one usage of an application to another usage of the same application.

In one or more embodiments, the advertisement may include an image. The image may be in any suitable format. In one or more embodiments, the image may be a graphics interchange format (.gif), video, or other format rather than a static image. Image location (205) specifies a location where an image associated with the advertisement (120) may be located. The image is also associated with other information, or limitations—image height (210) and image width (215). Image height (210) specifies the height of the image for the given ad format (200), while image width specifies the width of the image for the given ad format (200). The image height (210) and image width (215) may be measured by any suitable standard such as pixels, inches, centimeters, etc. Optionally, there may be more than one image in a single advertisement, in which case there would also be multiple image locations, image heights, and image widths.

In one or more embodiments, the advertisement may include text. Text location (220) specifies a location where text associated with the advertisement (120) may be located. The text is also associated with other information, or limitations—text height (225) and text width (230). Text height (225) specifies the height of the text for the given ad format (200), while text width (230) specifies the width of the text for the given ad format (200). The text height (225) and text width (230) may be measured by any suitable standard such as pixels, inches, centimeters, etc. Optionally, there may be more than one text area in a single advertisement, in which case there would also be multiple text locations, text heights, and text widths.

In one or more embodiments, disclosure (235) is text that indicates that the nearby text, images, or other items are an advertisement. This may be required by the application or by another entity in order for the user to distinguish the ad from other content in their stream. Alternatively, in one or more embodiments, disclosure (235) may be an image, video, audio, or any combination thereof.

In one or more embodiments, there may be additional element(s) (240) included in the ad format (200). Additional element(s) (240) may be any additional option or limitation available for the presentation of an advertisement. For example, additional element(s) (240) may include, but are not limited to: a poll, a survey, an advertiser name, additional image options, additional text options, videos, audio, content tagging, or any other content that may be included in an advertisement.

In one or more embodiments, hotspot (245) may be a portion of the image that is more important than other portions of the image. For example, if an image contains a logo of a company surrounded by other objects, then the logo may be the hotspot (245). By specifying a hotspot (245), if the image needs to be cropped, rotated, resized, or otherwise altered, the hotspot (245) may be prioritized for preservation, either in part or whole, so that (in this example) the company logo is preserved, while the superfluous content may be removed. Hotspot (245) may be of any suitable size or sizes, and may be located on any part of an image. For example, the hotspot (245) may be located in a central portion of the image. Alternatively, the hotspot (245) may be located not in a central portion of the image. Additional details related to using the hotspot for resizing or scaling the image are described below.

Figure 2B:
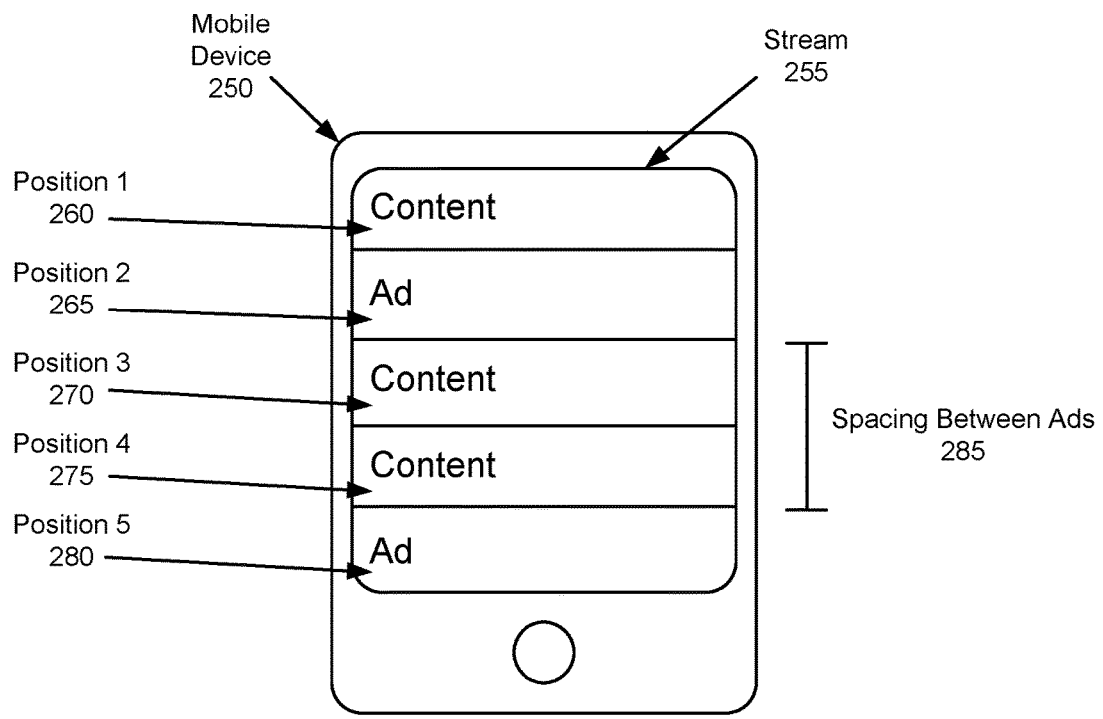
FIG. 2B shows a depiction of stream in accordance with one or more embodiments of the invention.

Referring to FIG. 2B, FIG. 2B shows a user interface of a mobile device (250) that includes stream (255) The mobile device (250) may be, for example, a smartphone. Stream (255) is shown on a display of mobile device (250). Within a stream (255) there are different positions (i.e., position 1 (260), position 2 (265), position 3 (270), position 4 (275), and/or position 5 (280)) where items may be located, such as content or advertisements. Content is items displayed, such as messages, images, or other things associated with the application that is displaying/generating stream (255). Specifically, in the stream shown in FIG. 2B, the content items are located in position 1 (260), position 3 (270), and position 4 (275). Stream (255) also includes advertisements. Specifically, the advertisements are native advertisements and look similar to the content items included in stream (255). In the stream shown in FIG. 2B, the advertisements are located at position 2 (265) and position 5 (280). The positions of content and the positions of advertisements may be set by a developer, publisher, or other suitable entity. The specifics of when and where advertisements may be shown are discussed in further detail, below.

In one or more embodiments, the spacing between ads (285) is the number of positions between advertisements. If there is too much space between ads, then a given application and/or stream may not be monetized to the most efficient level. Alternatively, too little space between ads may drive users away from using the application and/or stream and result in a less effective monetization scheme. Spacing between ads (285) is one factor of many that may be controlled by the developer, publisher, or other suitable entity, and is discussed in more detail, below.

Returning to FIG. 1, in one or more embodiments, software development kit (SDK) (125) is a set of software development tools that allow the deployment of advertisements using the method and system of this invention. The SDK (125) may easily be incorporated into the code, libraries, or other suitable portion of an application by the developer, thereby enabling the developer to easily access the functionalities described herein. SDK (125) may support developers creating application in a variety of different formats, operating systems, or other standards. Specifically, SDK (125) may include functionality to operate with any format, operating system, or other standard now known or later developed. Further, SDK (125) may enable a developer to easily access functionalities associated with ad placer (135), content selector (140), image resizer (150), and/or any other functionality included in the present invention. Because of the closely related nature of the functionalities of SDK (125) and other components of the invention, SDK (125) will be discussed in more detail in conjunction with other components of the invention.

In one or more embodiments, SDK (125) may be implemented in another form or method. Specifically, if the advertisements are being displayed on a website, a Hypertext Markup Language (HTML) and/or JavaScript tag implementation may be used to provide the functionality described with regards to SDK (125). In one or more embodiments, an HTML tag may be inserted into the webpage that acts similar to the SDK. The HTML tag causes some JavaScript to be downloaded and executed. The JavaScript is able to parse the HTML code of the website and identify additional HTML tags that identify information about the advertisement(s) such as ad location(s), image location(s), image width(s) and/or height(s), text placement(s), text width(s) and/or height(s), etc. The HTML and/or JavaScript embodiments may be implemented in any manner now known or later developed, and should not be limited to the above example.

In one or more embodiments, ad server (130) may be any suitable computing device or devices, such as a server, rack, mainframe, desktop Personal Computer (PC), laptop, Personal Digital Assistant (PDA), telephone, mobile phone, kiosk, cable box, and any other device. Ad server (130) is communicatively connected to image processing server (145), data store (155), developer device (160), and/or publisher device (165) via wired and/or wireless communications using any suitable communication standard, such as WiFi, the Internet, cellular data, etc. In one or more embodiments, ad server (130), image processing server (145), and/or data store (155) may be implemented on a single computing device, rather than on separate computing devices as depicted in FIG. 1. Alternatively, ad server (130), image processing server (145), and/or data store (155) may be implemented on separate computing devices. Further still, ad server (130), image processing server (145), and/or data store (155) may be implemented in separate virtual machines on a single device, or on any combination of the above methods, or any other suitable implementation. Ad server (130) includes ad placer (135), content selector (140), and ad dashboard (170).

In one or more embodiments, ad dashboard (170) includes functionality for building an advertisement. Ad dashboard (170) is an application that executes on ad server (130). Alternatively, ad dashboard (170) may be implemented on a computing device separate from ad server (130), such as a separate server. Specifically, ad dashboard (170) includes functionality to receive various components of the advertisement from a publisher, developer, and/or other suitable entity, and create the advertisement. Specifically, an image or images may be received, as well as various text variations (i.e., a short text variant, a long text variant, etc.), audio, video, and/or any other element of an advertisement may be received in any format now known or later developed. The specific location of items within an advertisement, and many other elements, may not be specified at the time the advertisement is built. Rather, those other elements may be determined at the time the advertisement is sent to a client device, at the time the advertisement is rendered, or at any other suitable time. In one or more embodiments, the specifics of location, etc., are not included because the publisher, developer, or other entity may not know the exact advertisement format details at the time the advertisement is built.

In one or more embodiments, ad placer (135) is an application and/or module executing on ad server (130) for placing advertisements in a stream (e.g., content at position 1, advertisement at position 2, content at position 3 etc. . . . ). Specifically, the ad placer (135) includes functionality for refreshing and/or caching advertisements, placing a single advertisement, placing multiple advertisements, placing advertisements of multiple formats, placing advertisements in sections, placing advertisements related to the content of the stream, gathering ad metrics, previewing advertisements, and other functionalities needed by the invention. Some, or all, of the functionality discussed with regards to ad placer (135) may be performed on or by client device (105) via the functionalities included in SDK (125).

In one or more embodiments, ad placer (135) includes functionality for refreshing and/or caching advertisements. Specifically, refreshing and/or caching advertisements refers to controlling what advertisements are sent to, or stored on, client device (105), and when those advertisements are inserted into a stream and displayed to a user. In one or more embodiments, ad placer (135) may respond to requests from a client device for more advertisements as discussed below with regards to placement of any type of advertisements.

In one or more embodiments, with regards to the caching of advertisements, many of the functionalities may be implemented on client device (105) via SDK (125). Specifically, the ad placer (135) (and/or SDK (125)) may set a hard cap on the number of advertisements that may be stored on a client device at any given moment, such as 1, 3, 5, or any other suitable number. Alternatively, the size of the cache may automatically adjust to (or the hard cap may be set based on) the particular usage patterns exhibited by the user and/or settings of the publisher, such as scroll speed, advertisement frequency, size of advertisements, size of content items in the stream, fill rate, etc. The cache may function as a queue, and advertisement may be removed from the cache in any suitable manner In one or more embodiments, when a client device receives an advertisement, an expiration timer may be set for the advertisement, such that after a time period, the advertisement is stale and will no longer be shown to a user. A publisher may not be charged for a stale advertisement, as a user never viewed the advertisement. The expiration timer may be of any suitable length, such as 5 minutes, 10 minutes, etc. Upon expiration of an advertisement, SDK (125) may immediately (or within a certain preset time limit) request additional advertisements from the ad placer. Alternatively, the SDK (125) may wait to refresh the expired advertisement. For example, the SDK (125) may wait until the number of advertisements in the cache falls below a certain level.

In one or more embodiments, ad placer (135) includes functionality for placing a single advertisement. Said another way, the ad placer (135) includes functionality to place individual advertisements within specific positions within a stream. The advertisement may be placed, for example, in a specific position within a stream, such as the first position, the 5$^{th}$, the 12$^{th}$, etc. The particular position may be pre-determined by any suitable entity, such as a developer and/or publisher. The publisher and/or developer may indicate, via a web interface or other suitable user interface, where he or she would like advertisements to appear. For example, a publisher may indicate that an advertisement should be placed at positions 3, 15, and 20 within a stream. In one or more embodiments, the advertisements may be set to repeat at a given frequency (i.e., every 10 positions, etc.) although the particular ad that is displayed may change. Additionally, or alternatively, the publisher and/or developer may specify spacing between advertisements (i.e., first advertisement at position 3, with 5 positions between advertisements).

In one or more embodiments, ad placer (135) and a client device may communicate regarding the placement of advertisements using a variety of functions, methods, queries, etc. For example, an ad request may return a collection of ad data (such as formatting information, image information, text content, etc.), which in one or more embodiments, may sometimes be empty. In one or more embodiments, the ad request may return a URL for an image to be used in the advertisement. The URL may be "incomplete." Specifically, the URL may have aspects that need to be processed by the SDK or other suitable components. For example, the provided URL to an image may be "http://www.abcimages.com/adimageXXXxXXX.image" where the "XXXxXXX.image" portion of the URL represents the desired size of the image. Thus, the SDK or other suitable element may process the URL to specify the desired size of the image for the advertisement, and the resulting URL may look like: "http://www.abcimages.com/adimage200x300.image." The URL may be processed to include any type or amount of information. A position request may return a collection of positions where advertisements should be placed. Optionally, the above to requests may be combined, such that ad positioning information is included with a collection of ad data. Various other tokens, objects, etc., may also be exchanged between the ad placer (135) and a client device. The responses may be sent and/or returned in any format, such as a JavaScript Object Notation (JSON) object.

In one or more embodiments, ad placer (135) includes functionality to place advertisements of multiple formats. The advertisements may be of any specified form, such as image, text, audio, video, some combination of the above, or any other suitable form. The publisher and/or developer may specify the format of a given advertisement for a given position(s). For example, a video advertisement may be placed every 15 positions while a text advertisement may be placed every 3 positions. In one or more embodiments, the format of an advertisement may be specified at the same time the advertisement positioning is set by the publisher and/or developer, or may be set at any other suitable time.

In one or more embodiments, ad placer (135) includes functionality to placing advertisements in sections. The sections refer to the formats used by operating systems for mobile devices. Ad placer (135) includes functionalities for interfacing and/or placing advertisements for any operating system, using any standard or method now known or later developed.

In one or more embodiments, ad placer (135) includes functionality to place advertisements related to the content of the stream. The SDK (125) may include functionality to determine the subject matter of the stream, either generally or at a high level of specificity. With this knowledge, when the publisher has indicated that he or she would like to place advertisements next to related content, the SDK (125) is able to override the positioning information set by the ad placer (135) and instead set the position of an ad such that the ad is next to a related content item.

In one or more embodiments, ad placer (135) includes functionality to gather metrics related to the advertisements placed into the stream. The metrics are gathered on and/or by the client device (105) (i.e., using functionality provided by SDK (125)). The metrics may include any information able to be tracked including, but not limited to: impressions, clicks, requests, number of ads displayed, user scroll speed, user time spent per viewing a content item, user time spent viewing an advertisement, and/or other activities performed by the user related to an advertisement or a stream where an advertisement may be placed. In one or more embodiments, the metrics may be gathered on a per-position basis. That is, if the same ad is displayed to two groups of users: group 1 and group 2, where group 1 has the ad displayed at position 3 of the stream, while group 2 has the ad displayed at position 13 of the stream, then there would be two separate sets of information gathered on the users. This high level of detail allows publisher to ensure the effectiveness of their advertisements. Alternatively, since the same ad was shown at two different positions (in the above example), the metrics gathered from both positions may also be combined.

In one or more embodiments, ad placer (135) includes functionality to preview an advertisement. Ad placer (135) may utilize metrics gathered from advertisements placed into the streams of various applications to enable the preview. Specifically, after an ad has been rendered, SDK (125) includes functionality to traverse through an ad view hierarchy and serializes the resulting ad view information. This serialized ad view information is sent to ad server (135), which stores the information. Ad placer (135) may then use the serialized ad view information to preview an ad for a publisher (i.e., publisher device (165)). See also, FIGS. 9A-9C.

In one or more embodiments, content selector (140) includes functionality for selecting which variation (when available) of content will appear in a native ad. The content selector (140) is able to select from many different types of content, such as images, text, etc. In one or more embodiments, content selector (140) determines the largest text variant that fits within the available space of a given ad format. Thus, if the ad format has a text width and height of 200 pixels by 300 pixels, then content selector (140) is able to select a text variant that fits within the ad format. Content selector (140) may select the largest text variant that fits. Alternatively, content selector (140) may select the second largest text variant that fits, or any other suitable variant. In one or more embodiments, content selector (140) may adjust the selected text variant by, for example, changing font size, changing the font type, or making other changes that affect the size of the text variant, to ensure that the selected text variant properly fits within the ad format. Further still, content selector (140) includes functionality to alter the text itself. For example, content selector (140) may cut some text short and only display part of the text, while adding ellipses ( . . . ) to indicate that text has been cut off and that a user could, for example, click the advertisement to see the rest of the text. Alternatively, content selector (140) may include functionality to summarize the content of the text to reduce the overall length of the text, remove "unnecessary" words to reduce the length, or any other suitable modification to alter a text variant to fit the available space. While content selector (140) has been described primarily with regards to text, one of ordinary skill in the art, having the benefit of this disclosure, will understand that content selector (140) also includes functionality for selecting or modifying content beyond text and, as such, the invention should not be limited to the above examples.

In one or more embodiments, image processing server (145) may be any suitable computing device or devices, such as a server, rack, mainframe, desktop Personal Computer (PC), laptop, Personal Digital Assistant (PDA), telephone, mobile phone, kiosk, cable box, and any other device. Image processing server (145) is communicatively connected to ad server (130) and/or data store (155) via wired and/or wireless communications using any suitable communication standard, such as WiFi, the Internet, cellular data, etc. In one or more embodiments, ad server (130), image processing server (145), and/or data store (155) may be implemented on a single computing device, rather than on separate computing devices as depicted in FIG. 1. Alternatively, image processing server (145), ad server (130), and/or data store (155) may be implemented on separate computing devices. Image processing server (145) includes image resizer (150).

In one or more embodiments, image resizer (150) is an application or module executing on image processing server (145). Image resizer (150) includes functionality to resize, adjust, or otherwise edit images for advertisements. In one or more embodiments, some, or all, of the functionality of image resizer (150) may be included in SDK (125), and performed on client device (105), rather than on image processing server (145). Image resizer (150) includes functionality to scale, crop, or letterbox an image. In one or more embodiments, image resizer (150) receives an image in the form of a link to a location in data store (155). Image resizer (150) includes functionality to retrieve the image from data store (155). Alternatively, the image may be provided along with the request sent to image resizer (150). Additional information may be included along with the request, such as the target width and height for the image, height and width of the hotspot (if any), coordinates of where the hotspot is (if any), or other suitable information related to the image or resizing of the image. In one or more embodiments, image resizer (150) includes functionality to determine when to crop, scale, or letterbox an image based on any available information.

In one or more embodiments, when image resizer (150) is cropping an image, the image may be scaled down to the target size. If there is a hotspot, the hotspot may be the determining factor—that is, the hotspot may be scaled until the hotspot fits within the target. Subsequently, the image may be translated such that the hotspot is centered within the target, and all of the remaining portions of the image outside of the target are cropped.

In one or more embodiments, when image resizer (150) is scaling an image, the image may be scaled in one dimension (i.e., width or height) until the hotspot fits inside the target box. Then, the image may be translated until the hotspot fits in the target, and is centered if possible. Then, all of the remaining image outside of the target may be cropped. In one or more embodiments, when image resizer (150) is letterboxing an image, the image may be scaled in both width and height until the entire image fits within the target. Then, the extra space within the target, if there is any, may be filled with any color, such as yellow, white, black, etc.

In one or more embodiments, data store (155) is a database, hard drive, server, cloud, or other suitable storage and/or computing device(s). Data store (155) may be separate from ad server (130) and/or image processing server (145) as shown in FIG. 1, or may be located on the same device or devices as ad server (130) and/or image processing server (145). Data store (155) is communicatively connected to ad server (130), image processing server (145), and/or client device (105) via wired and/or wireless communications using any suitable communication standard, such as WiFi, the Internet, cellular data, etc. In one or more embodiments, data store (155) is used to store images for advertisements. Specifically, data store (155) may store each image at a unique web address, and the image may be retrieved by the desired entity by simply accessing the web address. In such scenarios, advertisements may be sent, for example, from ad server (130) to client device (105) at a greatly reduced sized if client device (105) is able to subsequently access the image (typically the largest part of an ad, in terms of storage space needed), via a simple web address. Alternatively, the images in data store (155) may be accessed by other similar mechanisms. In one or more embodiments, data store (155) may also be used to store other large files needed for advertisements such as audio, video, etc.

In one or more embodiments, developer device (160) is a computing device used by the developer(s), or creator(s), of application (110). Developer device (160) may be any computing device including, but not limited to: smart phones, laptop computers, desktop computers, tablets, etc. Developer device (160) may have various software development tools and applications installed (not shown), so that the developer may create application (110). In one or more embodiments, developer device (160) may also have an SDK (not shown) installed, so that the functionalities of SDK (125) are also available to the developer for inclusion in their application, for testing, or for any other suitable use. Developer device (160) is communicatively connected with ad server (130) using a wired and/or wired connection, over any suitable medium, such as the Internet. As indicated by the dotted line, developer device (160) may optionally be communicatively connected with application (110) of client device (105).

In one or more embodiments, publisher device (165) is a computing device used by the publisher of advertisements. Publisher device (165) may be any computing device including, but not limited to: smart phones, laptop computers, desktop computers, tablets, etc. Publisher device (165) is communicatively connected with ad server (130) using a wired and/or wired connection, over any suitable medium, such as the Internet. Publisher device (165) includes functionalities to connect with ad dashboard (170) for the building and preview of, advertisements using, for example, a web browser or other suitable application. Optionally, publisher device (165) may include functionalities to connect with ad server (130) and/or any other suitable device. In one or more embodiments, the application used by publisher device (165) to access ad dashboard (170) may be a custom application or module.

Figure 3:
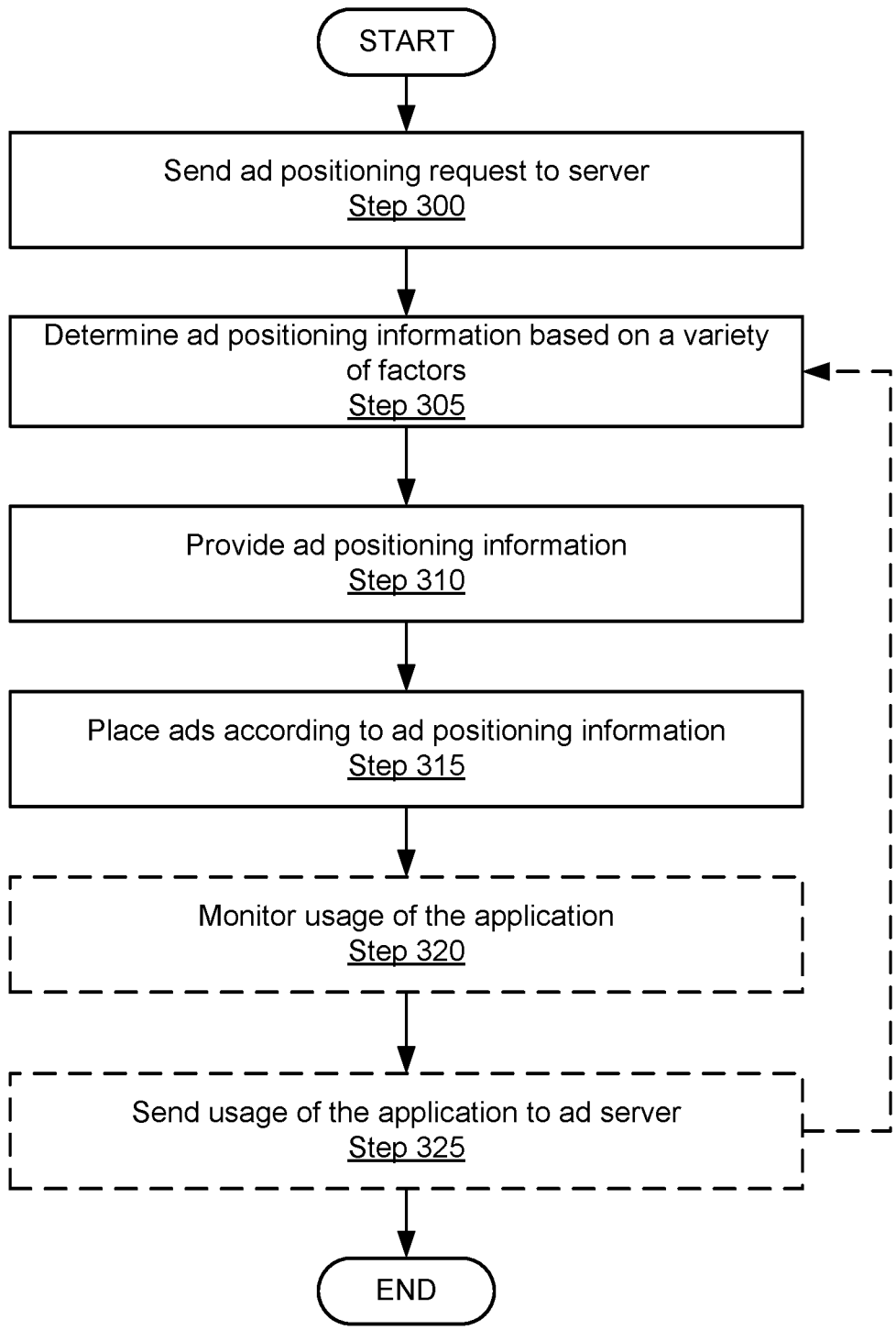
FIG. 3 shows a flowchart for ad positioning in accordance with one or more embodiments of the invention.

FIG. 3 shows a flowchart of a method for placing advertisements, in accordance with various embodiments of the invention. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 3 should not be construed as limiting the scope of the invention.

In Step 300, an ad positioning request is sent to the ad server. In one embodiment of the invention, the ad positioning request is sent from a client device. More specifically, in one embodiment of the invention, the ad positioning request is sent from the SDK (125) on the client device. Alternatively, the request may be sent using, for example, HTML, JavaScript, or any other suitable method. The positioning request may be sent based on any suitable factors, such as user activity (scrolling down the stream, opening an application, clicking an ad, etc.), ads timing out, empty and/or depleted ad cache, or any other suitable factor. The ad positioning request may be sent in any format and using any method now known or later developed.

In Step 305, ad positioning information is determined based on a variety of factors. In one or more embodiments, the positioning may have been previously specified by the publisher of the advertisement. Alternatively, the positioning may have been specified by the advertiser, developer, or other suitable entity. The specified positioning may indicate static positions within the stream where an advertisement should appear. For example, a publisher may specify that he or she wants an ad to be placed at position 3, 8, and 16 of a stream. Alternatively, the positions may be relative positions—positions that are based off of other measurements, such as another advertisement, how far a user scrolls in the stream, etc. In one or more embodiments, the positioning specified by the publisher may be repeating. For example, the publisher may specify that the first advertisement should appear at position 4, and repeat every 7 positions after that.

In one or more embodiments, the publisher, advertiser, or other suitable entity may instead specify that advertisements should appear next to a related content item. The advertisements, and/or the content items in the stream, may be associated with one or more subjects. For example, if the advertisement is for hiking equipment, then the subject associated with that advertisement may be hiking, nature, outdoors, etc. Accordingly, the advertiser, publisher, or other suitable entity may specify that the hiking equipment ad should appear near content related to the subjects associated with the advertisements (e.g., content items about hiking, nature, the outdoors, etc.). In one or more embodiments, this information is not known until milliseconds before the ad or ads may be inserted into the stream, and thus, the ad positioning may be handled on the client device in this embodiment. In one or more embodiments, even when specifying that advertisements should appear near related content, positional information may be provided in the event that there is no related content—then other ads may be placed as normal.

In one or more embodiments, the positional information may include a limit on the number of ads that appear in the stream, such as a limit of 5 total advertisements. Alternatively, or additionally, a limit on advertisements in a given space may be provided. For example, there may be a limit of a maximum of 3 advertisements within any 10 positions, thus ensuring that at maximum, only 30% of the stream is advertisements. Alternatively, the advertisements may be limited in any other suitable way.

In one or more embodiments, the positioning of advertisements is separate from the actual advertisement that will appear in said position(s). In other words, while a publisher may specify he or she wants an advertisement to appear every 5 positions, the same ad would not necessarily appear every 5 spaces. Rather, a different ad may appear in every specified position (i.e., position 5 has Ad A, position 10 has Ad B, position 15 has Ad C, etc.). Alternatively, some of the positions may have repeated ads placed in them. In one or more embodiments, the ad positioning information may additionally specify the type of advertisement that may appear in said position, such as text, video, audio, etc.

In one embodiment of the invention, the ad positioning information is may be provided on a per-publisher basis or on a per ad-basis. For example, the publisher may specify that ads should only be shown in the stream per the ad positioning information but that the actual ad shown in these positions may be determined by the ad server using any known or later implemented mechanism. In the above example, the publisher may be an application developer of an application, where the application includes a stream and the publisher only wants ads to be shown in certain positions within the stream in order to not impact the user experience with the application.

In Step 310, ad positioning information is provided, by the ad placer, to a client device. The ad positioning information may be sent in any format and/or using any method now known or later developed. The ad positioning information may be provided along with any other suitable information.

In Step 315, ads are placed according to the ad positioning information. The ads may be placed in any application, stream, or other suitable location. Once placed, the ads may have a timer associated with them so that they may be refreshed and/or replaced by a different ad after a time period. In one or more embodiments, when an ad is supposed to be placed near related content, the client device may override the placement decisions made by the ad server. The placement decisions may be overridden in any suitable manner.

In one or more embodiments, the ads may be placed in absolute positions (based on the ad positioning information). For example, in an application that adds content from the top of the stream, when the content is refreshed (i.e., a new content item is added to the top of the stream, thereby pushing older content down), the ads may automatically move up such that they are still in the same absolute positon. Alternatively, once placed, the ads may not adjust their positon. In other words, in the above example, if a content item is added at the top of the stream, the ads would move effectively move down one position in the stream.

In one embodiment of the invention, the ad that are placed in the stream in Step 315 may be ads that are obtained from the ad server at any time prior to the ads being placed in the stream.

In Step 320, usage of the application is monitored. The usage of the application may be monitored in any manner now known or later developed. Additionally, any aspect of the application or the usage of the application may be monitored including, but not limited to: scroll rate, time spent viewing each content item, time spent in the application per day, favorite content, ad click rate, ads viewed, and/or any other use that may be monitored. The collected usage information may be stored, either temporarily or permanently, on the client device. In one or more embodiments, the usage may be gathered on a per-position basis. That is, if the same ad is displayed to two groups of users: group 1 and group 2, where group 1 has the ad displayed at position 3 of the stream, while group 2 has the ad displayed at position 13 of the stream, then there would be two separate sets of information gathered on the users. This high level of detail allows publisher to ensure the effectiveness of their advertisements. Alternatively, since the same ad was shown at two different positions (in the above example), the usage information gathered from both positions may also be combined. In one or more embodiments, usage information about the user's usage of the device may also be collected. This may include any available information, including, but not limited to: time spent interacting with the device, standby time, frequency use of applications installed on the device, and/or any other suitable usage information.

In Step 325, usage of the application (also referred to as usage information) is sent to the ad server. The usage information may be sent to the ad server in any manner now known or later developed. Once received by the ad server, the usage may be stored in any suitable manner. In one or more embodiments, the usage information may be stored on a per-application per user basis (where the user may remain anonymous). Alternatively, the usage information may be aggregated in any suitable manner, such as per application. The usage information may be used by the ad server for recommending better placement of advertisements, automatically updating the positioning information for a given publisher, or for any other use. For example, if the publisher initially specifies that an absolute ad placement in locations 1 and 8 of the stream but, based on the usage information, users of the application have a tendency to scroll past the first 10 items (content and advertisements) in the stream, then the ad placer may automatically adjust the ad positioning information, for example, to show the ads in positions 11 and 19. The ad placer may then continue to collect usage information for the application and, if appropriate, update the ad positioning information again if the ad placer, using the usage information, determines that the new positions (i.e., positions 11 and 19 in the stream) are not effective.

In one or more embodiments, the usage information may be used by the ad server to automatically place advertisements without input from an advertiser, publisher, or other suitable entity. For example, an advertiser may simply create an advertisement without specifying where in a stream the advertisement should be displayed, and the ad server may then use the usage information to automatically place the advertisement in an appropriate location within the stream.

Any, or all, of the steps of FIG. 3 may be performed on an ad server. Alternatively, any, or all, of the steps of FIG. 3 may be performed on a client device. Further still, the steps of FIG. 3 may be performed by some combination of an ad server and a client device. The determination as to whether an ad server or a client device should perform a given step of FIG. 3 may be made by either device at any time, and for any suitable reason.

The following section describes various examples of the invention. The examples are included to aid in the understanding of the invention and are not intended to limit the scope of the invention.

Figure 4A:
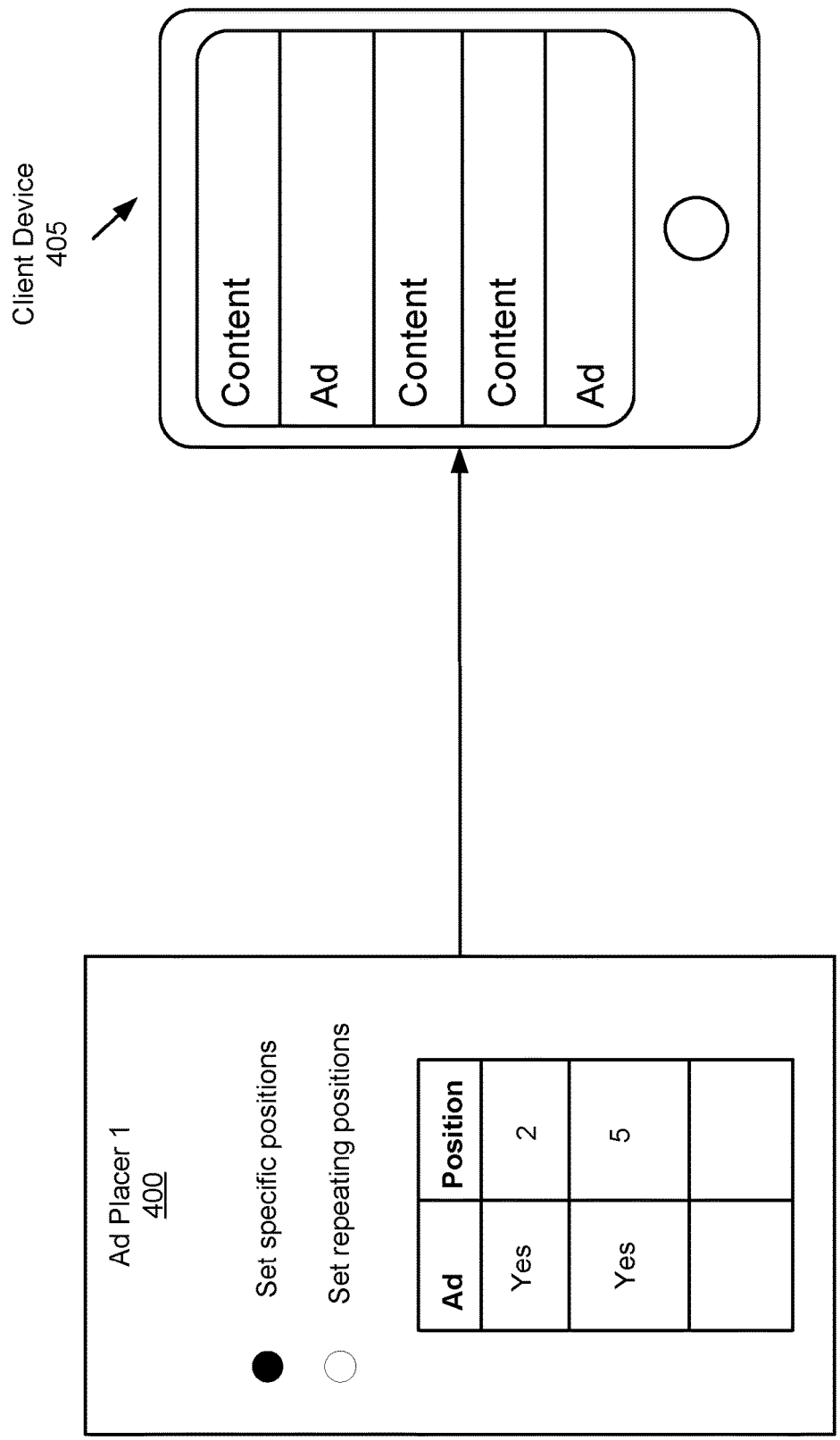
FIGS. 4A, 4B, 4C, and 4D show examples of ad positioning in accordance with one or more embodiments of the invention.

FIGS. 4A, 4B, 4C, and 4D show examples of ad positioning. Specifically, FIG. 4A shows an example of placing single ads at specified positions. Ad placer 1 (400) is an example of a user interface that may be presented to the publisher when they are determining ad placement for a given or set of ads. Ad placer 1 (400) enables the publisher to specify exactly where he or should would like their ads to appear in the stream of a user. Thus, in ad placer 1 (400), the publisher has elected to set specific positions for their advertisements, and has selected positions 2 and 5 for advertisements. This information is sent to a client device in response to a request for ad positioning. A user interface of a client device (405) is shown that includes a stream with content items at positions 1, 3, and 4, and advertisements at positions 2 and 5.

Figure 4B:
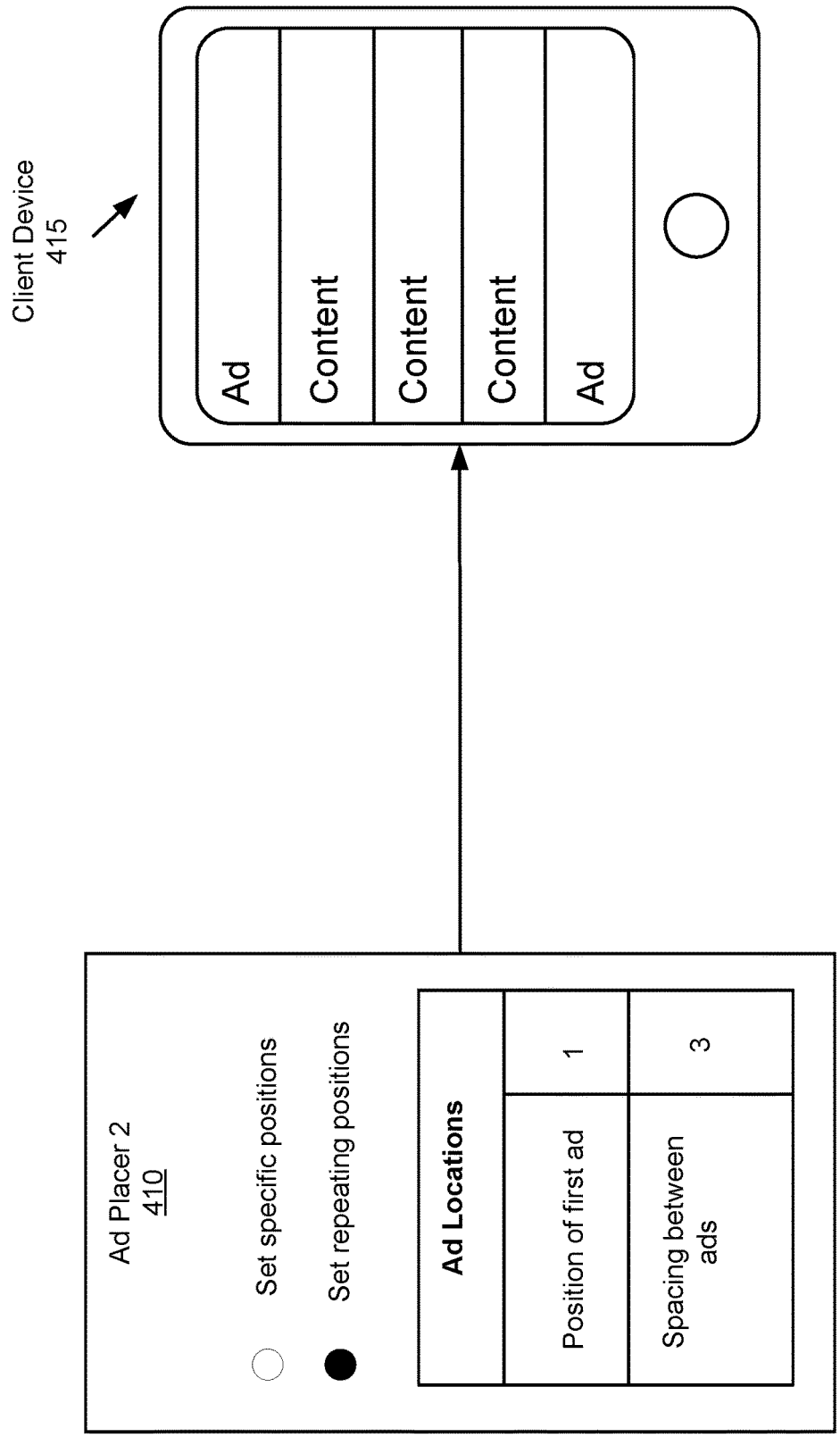

FIG. 4B shows an example of placing ads with repeating positions. Ad placer 2 (410) shows that the publisher has elected to set repeating positions for advertisements. Specifically, the publisher has selected the first position for an ad to be position 1, with 3 spaces between each ad. This information is sent to a client device in response to a request for ad positioning. A user interface of a client device (415) is shown that includes a stream with content at positions 2, 3, and 4, and advertisements at positions 1 and 5.

Figure 4C:
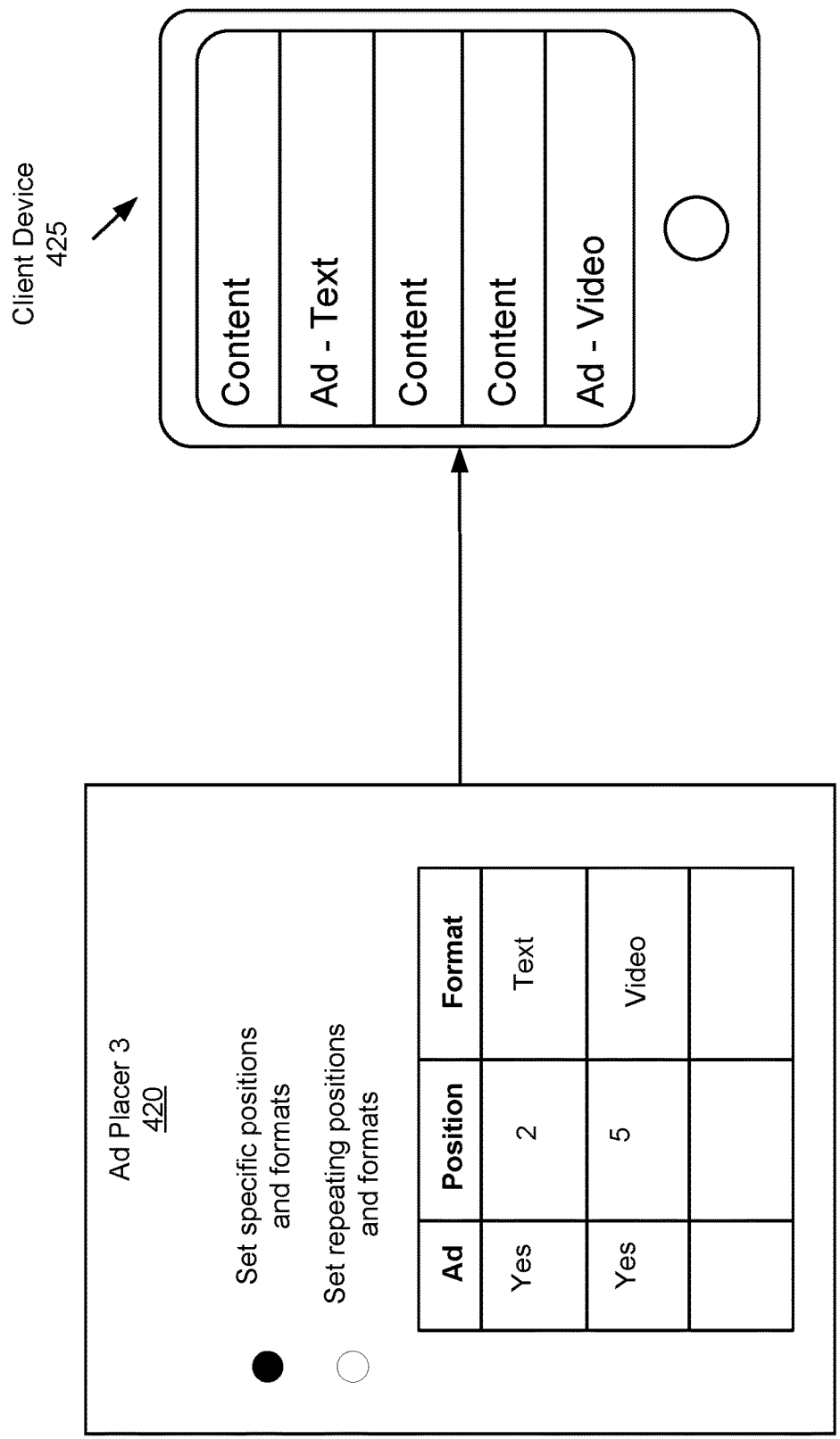

FIG. 4C shows an example of placing ads with specific formats. In ad placer 3 (420), the publisher has elected to set specific positions and formats for their advertisements, and has selected positions 2 and 5 for advertisements. The publisher has further specified that the ad in position 2 should be a text advertisement, while the ad in position 5 should be a video advertisement. This information is sent to a client device in response to a request for ad positioning. A user interface of a client device (425) is shown that includes a stream with content items at positions 1, 3, and 4, a text advertisement at position 2, and a video advertisement at position 5.

Figure 4D:
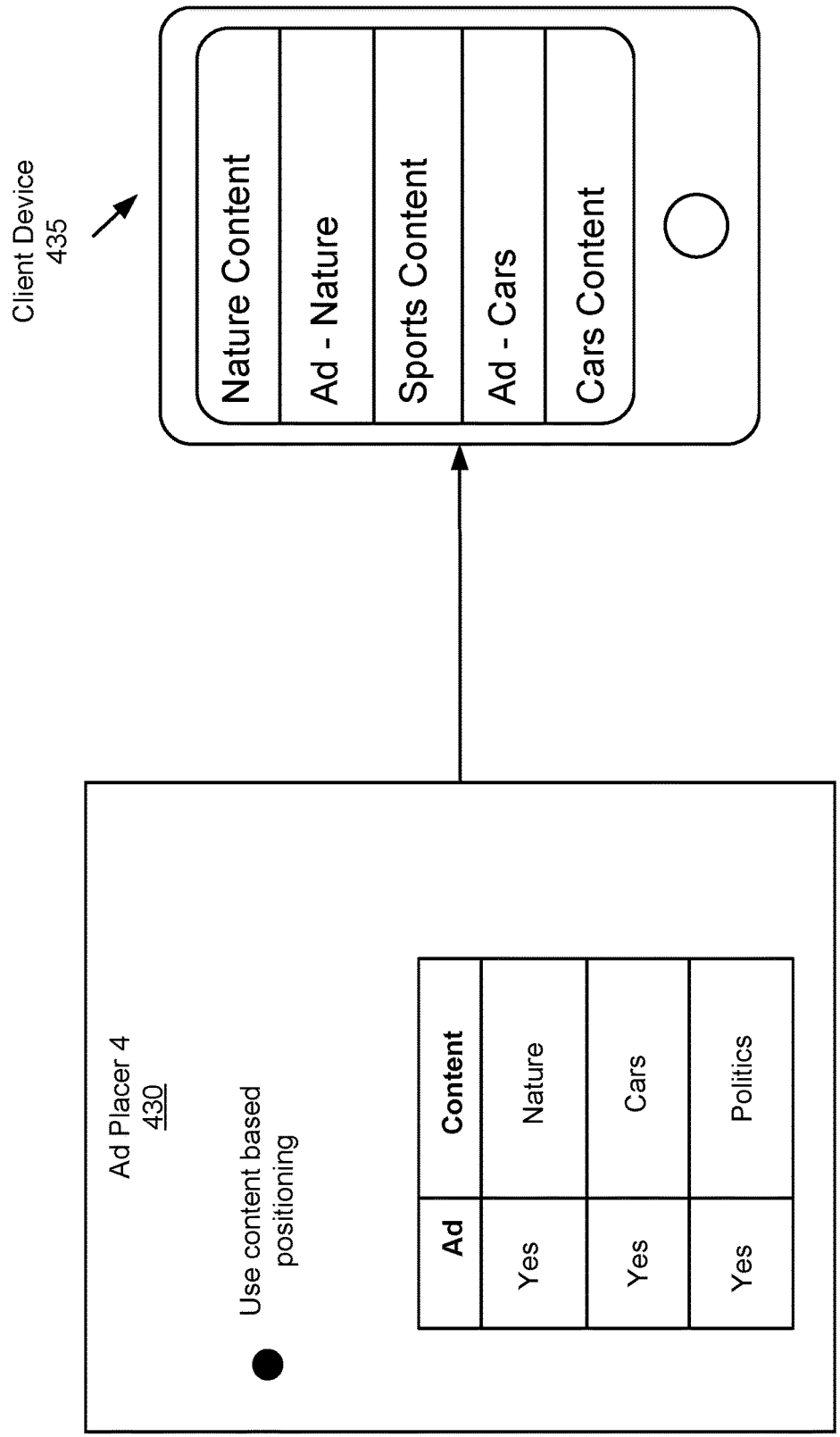

FIG. 4D shows an example of placing ads near related content. In ad placer 4 (430), the publisher has elected to use content based positioning. Additionally, the publisher has specified that he or she would like to place up to three ads, one ad is related to nature, one ad is related to cars, and one ad is related to politics. This information is sent to a client device in response to a request for ad positioning. A user interface of a client device (435) is shown that includes a stream with nature content in position 1, sports content in position 3, and car content in position 5. In response to this information the client device determines where to place the corresponding advertisements, and overrides any positioning information previously provided to it by the ad server. Thus, there is a nature ad in position 2 and a car ad in position 4—next to their related content items.

Optionally, the user interface may also allow the publisher to specify specific locations for the advertisements to appear, in the event that there is not related content (or even have other advertisements appear in the specified locations in lieu of the content specific advertisements). Thus, the publisher could have specified that an advertisement should appear at position 1, but the client device overrode that instruction due to the fact that there was content related to the subject of the advertisements.

Those skilled in the art will appreciate that while FIGS. 4A-4D shows four separate ad placers, a single ad placer may implement all four ad positioning schemes described in FIGS. 4A-4D.

Figure 5:
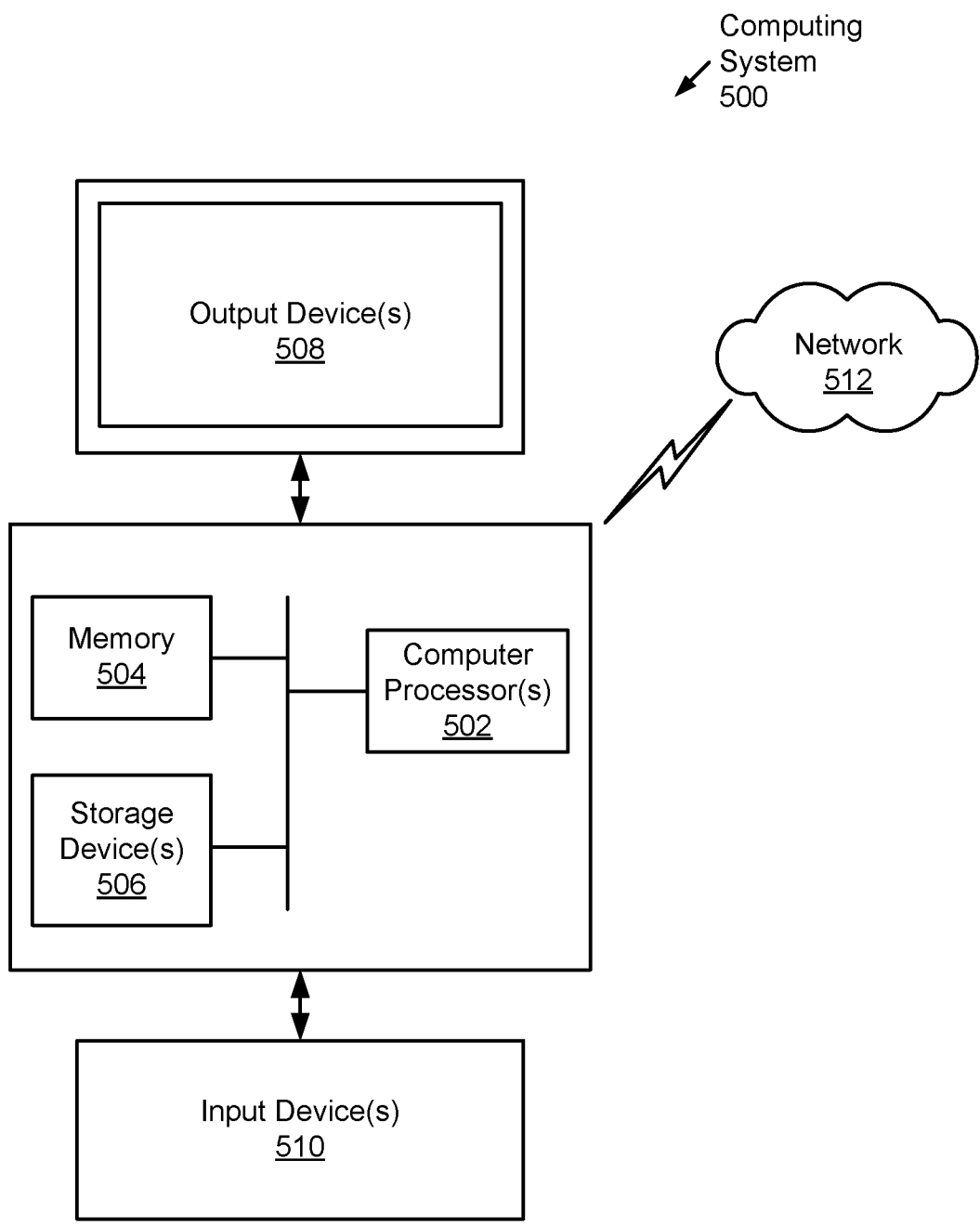
FIG. 5 shows a computing system in accordance with one or more embodiments of the invention.

Embodiments of the invention may be implemented on any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures may be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein.

What is claimed is:

1. A method comprising:
   receiving, from a device, a request for positioning information for placing a set of targeted content items in a display of a portion of a vertical message stream, the message stream including a related content item that includes content related to the set of targeted content items, wherein a first targeted content item of the set of content items includes a first content format and a second targeted content item of the set of content items includes a second content format different from the first content format, the first content format and the second content format selected from a video format, a text format, an image format, an audio format, or a combination format including two or more of text, video, images, and audio;
   in response to receiving the request:
      determining a first positioning information for the first targeted content item and a second positioning information for the second targeted content item in the message stream that includes the related content item; and
      sending the first positioning information and the second positioning information to the device, such that the device inserts the first targeted content item and the second targeted content item based on the first positioning information and the second positioning information at different vertical positions in a portion of the message stream displayed to a user of the device.

2. The method of claim 1, wherein the first positioning information and the second positioning information is each selected from a group consisting of a static targeted content position in the message stream, a relative targeted content position in the message stream, and a set of repeating positions for the message stream.

3. The method of claim 1, wherein determining the first positioning information and the second positioning information comprises determining the first positioning information and the second positioning information based on at least one of a content provider preference, an application developer preference for an application executing on the device, the device user's usage of the application, or the device user's usage of the device.

4. The method of claim 3, further comprising:
   collecting usage information of the application after at least one of the first targeted content item and the second targeted content item is placed in the message stream; and
   sending the usage information to a content server.

5. The method of claim 1, further comprising:
   receiving an updated request for the positioning information, wherein the updated request is in response to refreshing the message stream.

6. The method of claim 1, wherein each of the first positioning information and the second positioning information comprises a related content position in the message stream, and wherein the related content position comprises a position in the message stream relative to a related content item associated with the first targeted content item and the second targeted content item.

7. The method of claim 1, wherein each of the first targeted content item and the second targeted content item and one or more other content items in the message stream has the same format, wherein the format includes a specification of location and size of elements of that content item.

8. A system comprising:
   one or more processors; and
   a computer-readable storage medium storing instructions that, when executed, cause the one or more processors to:
      receive, from a device, a request for positioning information for placing a set of targeted content items in a display of a portion of a vertical message stream within an application executing on the device, the message stream including a related content item that includes content related to the set of targeted content items, wherein a first targeted content item of the set of content items includes a first content format and a second targeted content item of the set of content items includes a second content format different from the first content format, the first content format and the second content format selected from a video format, a text format, an image format, an audio format, or a combination format including two or more of text, video, images, and audio;
      in response to receiving the request:
         determine a first positioning information for the first targeted content item and a second positioning information for the second targeted content item in the message stream that includes the related content item; and
         send the first positioning information and the second positioning information to the device, such that the device inserts the first targeted content item and the second targeted content item based on the first positioning information and the second positioning information at different vertical positions in a portion of the message stream displayed to a user of the device via the application executing on the device.

9. The system of claim 8, wherein the first positioning information and the second positioning information is each selected from a group consisting of a static targeted content position in the message stream, a relative targeted content position in the message stream, and a set of repeating positions for the message stream.

10. The system of claim 8, wherein the instructions that cause the one or more processors to determine the first positioning information and the second positioning information comprise instructions that cause the one or more processors to determine the first positioning information and the second positioning information based on at least one of a content provider preference, an application developer preference for an application executing on the device, the device user's usage of the application, or the device user's usage of the device.

11. The system of claim 8, wherein each of the first positioning information and the second positioning information comprises a related content position in the message stream, and wherein the related content position comprises a position in the message stream relative to a related content item associated with the first targeted content item and the second targeted content item.

12. The system of claim 8, wherein each of the first targeted content item and the second targeted content item and one or more other content items in the message stream has the same format, wherein the format includes a specification of location and size of elements of that content item.

13. A non-transitory computer readable medium storing instructions that, when executed by a computer processor, cause the computer processor to:

receive, from a mobile device, a request for positioning information for placing a set of targeted content items in a display of a portion of a vertical message stream within an application executing on the mobile device, the message stream including a related content item that includes content related to the set of targeted content items, wherein a first targeted content item of the set of content items includes a first content format and a second targeted content item of the set of content items includes a second content format different from the first content format, the first content format and the second content format selected from a video format, a text format, an image format, an audio format, or a combination format including two or more of text, video, images, and audio;

in response to receiving the request:
 determine a first positioning information for the first targeted content item and a second positioning information for the second targeted content item in the message stream that includes the related content item; and
 send the first positioning information and the second positioning information to the mobile device, such that the mobile device inserts the first targeted content item and the second targeted content item based on the first positioning information and the second positioning information at different vertical positions in a portion of the message stream displayed via the application to a user of the mobile device, wherein the application includes one or more of a social network application, a messaging application, a financial application, a gaming application, a productivity application, a video application, or a photography application.

14. The non-transitory computer readable medium of claim 13, wherein the first positioning information and the second positioning information is each selected from a group consisting of a static targeted content position in the message stream, a relative targeted content position in the message stream, and a set of repeating positions for the message stream.

15. The non-transitory computer readable medium of claim 13, wherein the instructions that cause the computer processor to determine first positioning information and the second positioning information comprise instructions that cause the computer processor to determine the first positioning information and the second positioning information based on at least one of a content provider preference, an application developer preference for an application executing on the mobile device, the mobile device user's usage of the application, or the mobile device user's usage of the mobile device.

16. The non-transitory computer readable medium of claim 13, wherein each of the first positioning information and the second positioning information comprises a related content position in the message stream, and wherein the related content position comprises a position in the message stream relative to a related content item associated with the first targeted content item and the second targeted content item.

17. The non-transitory computer readable medium of claim 13, wherein each of the first targeted content item and the second targeted content item and one or more other content items in the message stream has the same format, wherein the format includes a specification of location and size of elements of that content item.

\* \* \* \* \*